United States Defensive Publication [19] (H) [11] T970,004

Bauer [43] May 2, 1978

[54] AMBIENT CURABLE SATURATED EPOXY RESIN COMPOSITIONS

[75] Inventor: Ronald S. Bauer, Houston, Tex.

[73] Assignee: Shell Oil Company

[21] Appl. No.: 810,237

[22] Filed: Jun. 27, 1977

Related U.S. Application Data

[63] Continuation of Ser. No. 707,908, Jul. 22, 1976, abandoned.

[51] Int. Cl.[2] ..... C08G 59/54

[52] U.S. Cl. ..... 260/18 EP; 260/2 EC; 260/18 PN; 260/47 EC; 260/47 EN

[57] ABSTRACT

Saturated epoxy resin compositions, e.g., glycidyl polyethers of hydrogenated bisphenol A, may be cured in 3 to 7 days at ambient temperatures with aliphatic amines and polyamides in the presence of selected catalysts such as para-toluenesulfonic acid, boron trihalide complexes and stannous salts of monocarboxylic acids.

7 Claims, No Sheets Drawing,

17 Pages Specification

The file of this unexamined application may be inspected and copies thereof may be purchased (849 O.G. 1221, Apr. 9, 1968).